106. COMPOSITIONS, COATING OR PLASTIC
83

Patented July 30, 1940

2,209,678

UNITED STATES PATENT OFFICE 2,209,678

METHOD OF MAKING LIGHTWEIGHT GLASSLIKE MATERIAL

Albert A. Fowler, North Hollywood, and Russell M. Otis, Pasadena, Calif.

No Drawing. Application December 18, 1936, Serial No. 116,642

3 Claims. (Cl. 18—47.5)

This invention relates to material of spumiform structure and of relatively light weight.

In our patent, No. 2,038,034, we disclosed a material composed of a solidified silicate having a spumiform structure, that is, a bubbled or intumesced solidified material having a structure similar to that of foam. This spumiform material is well adapted to heat insulation and we have applied it to this use in several different forms—pulverulent or granular, and also as solid slabs. In the afore-mentioned patent, we specifically disclosed the use of alkaline silicates such as silicates of sodium and potassium. We found, however, that materials made from these silicates alone are water absorbent and are in time dissolved in presence of water, which properties, while not affecting their application to many classes of work, ill-adapt them for other purposes.

In an application for Letters Patent, Serial No. 116,644, filed by us concurrently with the present application, we disclosed a glass-like material of spumiform character including in its composition alkaline oxide, boric oxide, and silicon dioxide, which composition has great advantages over alkaline silicates in water insolubility, lightness of weight, and character of particle. While that material will maintain its structure and not deteriorate in the presence of water, it will nevertheless pick up water by capillary action. In many applications this is not objectionable, but where a heat insulating material may come in contact with water, as in the walls of a house wherein water leaks are not always prevented, it is very desirable that the heat insulation repel water.

It is therefore an object of the present invention to provide a glasslike material of a spumiform structure which is water-repellent.

Another object of our invention is to provide a substantially homogeneous, intumescent, water-repellent material.

Another object of the invention is to provide water-repellent spumiform material in both granular and molded form.

Another object is to provide granular spumiform material, the particles of which have water-repellent surfaces.

Still another object of the invention is to provide methods for making the afore-mentioned materials.

Our preferred material is made by adding a pitchy water-repellent substance to one of the compositions disclosed in our copending application above referred to. As an example, we may heat 100 parts by weight of a sodium silicate solution having a 37% solid content comprising a sodium silicate with a mol ratio of silicon dioxide to sodium oxide of 3.15, and add to this 13.5 parts by weight of sodium tetraborate of 55% solid content dissolved in an equal quantity of hot water. Immediately a white lumpy precipitate is formed which is dissolved upon further heating and agitation. When all the precipitate is dissolved, the solution is clear, thick and viscous. At this stage we add preferably about 5 parts by weight of asphalt pitch and stir it into the solution until it is uniformly distributed therein.

In the next step of the process, the thick viscous liquid resulting from the above-described step is poured out into shallow pans, or onto a moving belt, to be partially desiccated. In using pans, the material is poured to a depth of ¼ to ½ inch and the pans are placed in an oven with a temperature of about 350° F. In using a belt, the material is poured or spread in a relatively thin layer onto the belt and the belt is passed through a heated oven space. In any case, the drying is continued until a condition is reached at which, when the material is cooled to atmospheric temperature, it is a hydrous solid. This condition generally corresponds to a water content of from 15% to 25% of the material.

After the partially desiccated material has been cooled, it is comminuted to a size of particle which depends upon the finished material which it is desired to make. The material may be readily cracked and screened. When granular material is to be the finished product, the hydrous or partially desiccated intumescent composition is preferably comminuted to from 40 mesh to 14 mesh in size, the larger particles making proportionally larger particles of the finished intumesced material. When molded bodies are to be made, the partially desiccated material of about 30 mesh is employed.

In making granular spumiform material, we heat the comminuted, partially desiccated material rapidly by contacting it with a hot surface maintained at a temperature of from 650° F. to 900° F. This heating may be conducted in a heated drum in which an agitator is at work. The heating is done as rapidly as possible and preferably continues until desiccation of the particles is substantially complete. In this heating operation, the particles presumably soften under the high temperatures and the steam which is formed in them, due to the contained water, stretches and expands the particles until the water has all left, when solidification occurs and expansion ceases. In this operation each partially desiccated particle expands or explodes into one of from 30 to 40 times its original volume. The result is a granular material consisting of individual bubbled, intumesced, or spumiform particles each comprising one or more small hollow spherical shells of relatively thin, glasslike, water-repellent substance. Our use of the word "granular" in this specification is meant to describe a material in which distinct granules are recognizable and is not meant to be restricted to any size of particle, as these may be from the size found in fine powder to that common in what might more properly be termed chunks. In applying the term spumiform to describe our material we do not intend that any limitation as to size of the material shall be implied. Some spumiform granules are so small that they consist of only a single bubble, while a molded spumiform body may consist of millions of cells or passages with thin walls between. This bubbled character accompanied by relatively thin bubble walls, is the distinguishing feature of our material and is what we mean by the term spumiform. The thin walls, which are generally of much less thickness than the enclosed bubble spaces, permit deflection under pressure and thus cause a body of the granules to be compressible and resilient.

The spumiform granular material of the above-described composition and made in the above-described manner is really a bituminous glass and is very water-repellent, and when it is placed on water it will float high for days. It weighs from 1 to 1.5 lbs. per cubic foot and is a very fine heat insulator. When compressed into an insulation compartment and sealed under compression, the material will not settle because of the small inertia forces on the light granules when subjected to vibration and because of the very considerable resilience of the individual granules.

In making molded bodies of our bituminous glass composition, we preferably only partially intumesce particles of the partially desiccated composition to form partially expanded granules containing from about 7% to 12% of water. This granular material we compress into the molding form, which may be of any desired shape, close the form with a loosely fitting cover to permit the escape of water vapor but not of the solid contents, and heat the form and contents at a temperature preferably of from 750° F. to 1000° F. for a time sufficient to effect substantially complete desiccation of the material. For a block 1 inch thick the heating may take place for from 20 to 30 minutes. As the contents of the form are heated, the individual particles soften and are expanded by the pressure of steam formed within them. They attempt to expand against one another while in the softened condition and unite to form one spumiform body of homogeneous composition which becomes solid when the material has been completely desiccated. This body has water-repellent substance substantially uniformly distributed throughout. The weight of the finished molded body is controlled by the amount of hydrous material put into the form, but may readily be made from 4 to 12 lbs. per cu. ft.

The asphalt which we prefer to use in the above-described composition is one having a "penetration" of from 100 to 250, but we may use other asphalts. We may employ either natural or artificial asphalts, and of artificial asphalts, either steam refined or air blown or that made by any other process, or we may employ asphalt in the form of a water emulsion. We may also employ other pitches such as coal tar pitch, and water-repellent pitch derived from either animal or vegetable matter and in our use of the word pitch herein we use it in its broad sense and intend to include suitable waxes and all such equivalent substances.

In the example above set forth, we disclosed one particular composition including certain proportions of sodium oxide, boric oxide and silicon dioxide, but we may vary these proportions and secure the same advantages following employment of certain proportions of these three oxide components as is set out in our copending application above referred to. Therein it is stated that the most preferable range of compositions including alkaline oxide, boric oxide, and silicon dioxide are those in which these three components are in proportions defined by the condition that the mol fraction of boric oxide is greater than .03 and greater than (2A—.46) but less than .15 and less than (2A—.35) where A is the mol fraction of the alkaline oxide. In the example above, we used sodium silicate, but instead we can use other alkaline silicates, as potassium silicate, as the source of alkaline oxide.

We may incorporate pitch in alkaline silicate solution in a manner similar to that in which we incorporate it in the thick viscous alkaline oxide-boric oxide-silicon dioxide composition described above. In this case, we heat the alkaline silicate solution, for example, sodium silicate, to a temperature above the melting point of the pitch we employ. About 5 parts by weight of pitch are employed to each 100 parts of sodium silicate solution having a 37% solid content. The pitch, for example, asphalt, is stirred into the alkaline silicate solution until a homogeneous mixture is effected. The procedure then follows that above described for the compositions including the three oxides. By the methods there set forth water-repellent granular spumiform material and molded spumiform material may be made of this intumescent alkaline silicate-pitch composition.

In a like manner we may combine pitch with sodium tetraborate for hydrous sodium tetraborate intumesces in a manner similar to alkaline silicate and to the composition of alkaline oxide, $B_2O_3$, and $SiO_2$ above described. We dissolve the sodium tetraborate in water, evaporate water from the solution until it is thick and stir the pitch into it until a uniform mixture results. We use 8 parts by weight of asphalt pitch to 100 parts of sodium tetraborate of 55% solid content. This mixture is cooked at a temperature not over 350° F. until a condition is reached at which the composition will solidify on cooling. It is then cooled, comminuted, and expanded by heat following the methods previously described for the other compositions to make either a granular, water-repellent, spumiform material or a molded spumiform material.

Instead of making a homogeneous mixture of pitch and one of the intumescent substances above mentioned, we may make a water-repellent granular spumiform material having the water-repellent substance only on the exteriors of the spumiform granules. Thus, we may make a thick viscous solution of alkaline silicate, or of sodium tetraborate, or of the composition of alkaline oxide, boric oxide, and silicon dioxide, partially desiccate such solution to a condition in which it will be a solid when cool, cool, comminute, and intumesce this material by heat, all as previously described. In this manner we make a white granular spumiform material. We then coat the granules of this material with water-repellent substance which may be pitch, or a water insoluble stearate such as zinc or aluminum stearate or a water insoluble palmitate such as zinc or aluminum palmitate or other equivalent water-repellent substance. From 1 to 2 ozs. of pitch or 1.2 oz. of water-repellent stearate are preferably employed per cu. ft. of granular spumiform material. In the case of pitch, it may be melted and sprayed in a finely divided form into a large quantity of the hot granular material while the granules are being tumbled. In this manner the pitch is distributed thinly on the granules and melted to flow over their surfaces while they are tumbled. Large pieces of pitch cannot be mixed with the granules because the individual spumiform granules are not strong enough to mix successfully with large pieces of even molten pitch. The water insoluble stearates, palmitates or pitch may also be applied to the granular material by spraying into a quantity of the granules a solution of one or more of these water-repellent substances in a solvent such as benzene. The water insoluble stearates and palmitates are, however, most successfully applied to the granule surfaces by mixing a fine powder of the stearate or palmitate into a quantity of hot spumiform granules at a temperature high enough to melt the water-repellent powder and cause it to flow over the surfaces of the granules as they are tumbled. The same techniques above described may, of course, be employed to apply any of these water-repellent substances also to the spumiform granular material which itself contains a water-repellent substance homogeneously distributed therein, and thereby provide a still greater degree of water resistance. In introducing water-repellent substance into a body of spumiform granules, we employ an amount of water-repellent substance less than that required to fill the voids between the granules, and thus secure only a thin coating of water-repellent substance on the exterior surfaces of the granules.

In using the term "intumescent substance" herein, we mean to describe a substance of the class of those disclosed which under proper circumstances is capable of intumescence, but do not mean to imply that an intumescent substance is always capable of intumescence; for a solidified intumescent substance which is completely desiccated, or anhydrous, can no longer intumesce.

It is understood that various substances and methods not specifically mentioned herein may be employed by those skilled in the art to accomplish the objects of our invention without departing from the spirit thereof as defined in the appended claims.

We claim:

1. The method of making a water-repellent spumiform composition which includes the steps of forming a thick viscous hydrous solution of an intumescent substance, distributing pitch uniformly into this solution, partially desiccating said mixture to form a hydrous solid, comminuting said solid, and heating said comminuted material at a temperature sufficiently high to create therein a spumiform structure.

2. The method of making a water-repellent spumiform composition which includes the steps of forming a thick viscous hydrous solution containing alkaline oxide, boric oxide, and silicon dioxide, distributing pitch uniformly into this solution, partially desiccating said mixture to form a hydrous solid, comminuting said solid, and heating said comminuted material at a temperature sufficiently high to create therein a spumiform structure.

3. The method of making a molded body of spumiform structure, which comprises forming a uniform mixture of pitch in a hydrous solution of an intumescent substance, partially desiccating said mixture to form a solid containing water, comminuting said solid, heating said comminuted material to form intumescent spumiform particles retaining some water, confining said spumiform particles in a molding form, and heating said form and contents at a temperature sufficiently high to cause said intumescent particles to unite in a single spumiform structure.

ALBERT A. FOWLER.
RUSSELL M. OTIS.